(12) United States Patent  
Hiller

(10) Patent No.: US 11,845,224 B2
(45) Date of Patent: Dec. 19, 2023

(54) ADDITIVE MANUFACTURING METHODS AND SYSTEMS FOR DETECTION AND EXTRACTION OF IMPURITIES

(71) Applicant: The Boeing Company, Chicago, IL (US)

(72) Inventor: Nathan D. Hiller, Irvine, CA (US)

(73) Assignee: The Boeing Company, Arlington, VA (US)

(*) Notice: Subject to any disclaimer, the term of this patent is extended or adjusted under 35 U.S.C. 154(b) by 69 days.

(21) Appl. No.: 17/375,413

(22) Filed: Jul. 14, 2021

(65) Prior Publication Data

US 2022/0080664 A1    Mar. 17, 2022

Related U.S. Application Data

(60) Provisional application No. 63/078,180, filed on Sep. 14, 2020.

(51) Int. Cl.
*B29C 64/35* (2017.01)
*B33Y 10/00* (2015.01)
(Continued)

(52) U.S. Cl.
CPC ............ *B29C 64/35* (2017.08); *B29C 64/153* (2017.08); *B29C 64/218* (2017.08); *B29C 64/268* (2017.08); *B29C 64/386* (2017.08); *B33Y 10/00* (2014.12); *B33Y 30/00* (2014.12); *B33Y 40/00* (2014.12); *B33Y 80/00* (2014.12);
(Continued)

(58) Field of Classification Search
CPC ..... B29C 64/35; B29C 64/386; B29C 64/393; G01N 21/94
See application file for complete search history.

(56) References Cited

U.S. PATENT DOCUMENTS

| 6,410,912 | B1 * | 6/2002 | Villani | B81C 1/00666 250/252.1 |
| 10,343,308 | B2 * | 7/2019 | Hess | B29C 35/0805 |

(Continued)

FOREIGN PATENT DOCUMENTS

| DE | 102015107837 A1 * | 11/2016 | ............ B22F 3/1055 |
| EP | 2 565 022 B1 | 12/2019 | |

(Continued)

OTHER PUBLICATIONS

Extended European Search Report prepared by the European Patent Office in application No. EP 21 18 3646.5 dated Feb. 1, 2022.

*Primary Examiner* — Xiao S Zhao
*Assistant Examiner* — Nicholas J Chidiac
(74) *Attorney, Agent, or Firm* — McDonnell Boehnen Hulbert & Berghoff LLP

(57) ABSTRACT

An additive manufacturing system for extraction of impurities in additive manufacturing material, the system including an additive manufacturing machine for manufacturing a part using additive manufacturing material. The system may additionally include a conductive plate adjacent to the additive manufacturing material. The system can further include an energy source for distributing an electric charge through the conductive plate adjacent to the additive manufacturing material. Distributing the electric charge through the conductive plate can attract impurities from the additive manufacturing material to the conductive plate.

20 Claims, 5 Drawing Sheets

(51) Int. Cl.
    *B33Y 30/00*         (2015.01)
    *B33Y 40/00*         (2020.01)
    *B29C 64/386*       (2017.01)
    *G01N 21/94*        (2006.01)
    *B33Y 50/00*         (2015.01)
    *B33Y 80/00*         (2015.01)
    *B29C 64/153*       (2017.01)
    *B29C 64/268*       (2017.01)
    *B29C 64/218*       (2017.01)
    *B29K 105/12*       (2006.01)

(52) U.S. Cl.
    CPC ........ *G01N 21/94* (2013.01); *B29K 2105/124* (2013.01); *B29K 2995/0008* (2013.01); *B29K 2995/0012* (2013.01); *B29K 2995/0044* (2013.01); *B33Y 50/00* (2014.12)

(56) References Cited

U.S. PATENT DOCUMENTS

2016/0016336 A1*   1/2016   Hess ....................... B22F 12/00
                                                                                                 204/474
2017/0246709 A1     8/2017   Guerrier et al.

FOREIGN PATENT DOCUMENTS

| GB | 2 526 904 A | 12/2015 |
|----|----|----|
| WO | 2018/078057 A1 | 5/2018 |
| WO | 2018/200303 A1 | 11/2018 |

* cited by examiner

ADDITIVE MANUFACTURING METHODS AND SYSTEMS FOR DETECTION AND EXTRACTION OF IMPURITIES

CROSS REFERENCE TO RELATED APPLICATION

The present disclosure claims priority to U.S. provisional patent application No. 63/078,180, filed on Sep. 14, 2020, the entire contents of which are herein incorporated by reference.

FIELD

The present disclosure relates generally to methods and systems for detection and extraction of impurities in additive manufacturing material, and more particularly to utilizing a conductive plate to attract and extract impurities from an additive manufacturing sample. Additionally, the present disclosure relates generally to methods and systems for producing compositions in additive manufacturing material samples.

BACKGROUND

A quality of powder used in additive manufacturing (AM) methods can affect a quality of parts built from the powder. Particle size factors influence flowability and thickness of each powder layer in a build box. For high-performance applications, it can be important to identify additional factors, such as types, numbers, and sizes of particulate contaminants that may be present in the powder. Contaminants may be introduced during powder manufacture, handling, or during the build process itself. Contaminants contained within a batch of powder can become introduced into a part when the contaminants are incorporated into the powder, and the contaminants can remain as discrete particulates or non-fused interfaces that act as stress concentrators.

A presence of contaminates may decrease a life of the part by increasing a likelihood of fatigue crack.

Currently, a human operator uses a microscope to review an additive manufacturing powder sample for foreign object debris (FOD) or contaminants. The human operator uses judgement to identify a quantitative count of FOD in a powder sample. This manual process is time-consuming and tedious, and prone to under-estimating an amount of FOD in an additive manufacturing powder sample. Additionally, when ultraviolet light is used to detect FOD, the human operator's safety is at risk.

SUMMARY

In an example, an additive manufacturing system for extraction of impurities that includes an additive manufacturing machine for manufacturing a part using additive manufacturing material, a conductive plate adjacent to the additive manufacturing material, and an energy source for distributing an electric charge through the conductive plate adjacent to the additive manufacturing material. Distributing the electric charge through the conductive plate attracts impurities from the additive manufacturing material to the conductive plate.

In another example, a method for extracting impurities in additive manufacturing material that includes generating an electric charge through a conductive plate adjacent to additive manufacturing material, and, while generating the electric charge through the conductive plate, attracting impurities to the conductive plate from the additive manufacturing material.

In still another example, a method of producing a composition in additive manufacturing material that includes spreading, by a roller, a layer of additive manufacturing material, the layer of the additive manufacturing material including elongated fibers. The method also includes generating an electric field across the layer of additive manufacturing material and, while generating the electric field across the layer of the additive manufacturing material, aligning the elongated fibers within the layer. The method further includes solidifying, by way of an energy source, the layer of additive manufacturing material and aligned elongated fibers.

In yet another example, an additive manufacturing system that includes an additive manufacturing machine for manufacturing a part using additive manufacturing material and a roller for spreading a layer of additive manufacturing material. The layer of the additive manufacturing material includes elongated fibers. The additive manufacturing machine also includes an electric field generator for generating an electric field across the layer of additive manufacturing material and aligning the elongated fibers within the layer. The system additionally includes an energy source for solidifying the layer of additive manufacturing material and aligned elongated fibers.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

A. Detection and Extraction of Impurities in Additive Manufacturing Material

Within examples, methods for detection and extraction of impurities in additive manufacturing material are described that include generating an electric charge through a conductive plate adjacent to additive manufacturing material and attracting impurities to the conductive plate from the additive manufacturing material.

Using methods described herein can enable automated extraction and detection of contamination, such as impurities and/or foreign object debris, in additive manufacturing materials via electrostatic techniques. Conductive plates are utilized to electrostatically attract and extract the impurities from the samples of additive manufacturing materials.

Example methods and systems described herein can remove a need for a human operator to review additive manufacturing powder for contamination or foreign object debris, and enable more accurate identification and quantification of foreign object debris. The amount of foreign object debris in a sample of additive manufacturing material impacts quality and mechanical properties (for example, fatigue life and tensile strength) of a finished additively manufactured part. Thus, determination of an amount of the contamination can be useful in decisions for whether to replace the additive manufacturing material.

The example methods for detection of impurities in additive manufacturing material can be used in an additive manufacturing system, for example. An example additive manufacturing system can include an additive manufacturing machine for manufacturing a part using additive manufacturing material and a conductive plate adjacent to the additive manufacturing material. An example system further includes an energy source for distributing an electric charge through the conductive plate adjacent to the additive manufacturing material. Distributing the electric charge through the conductive plate attracts impurities from the additive manufacturing material to the conductive plate.

Figure 1:
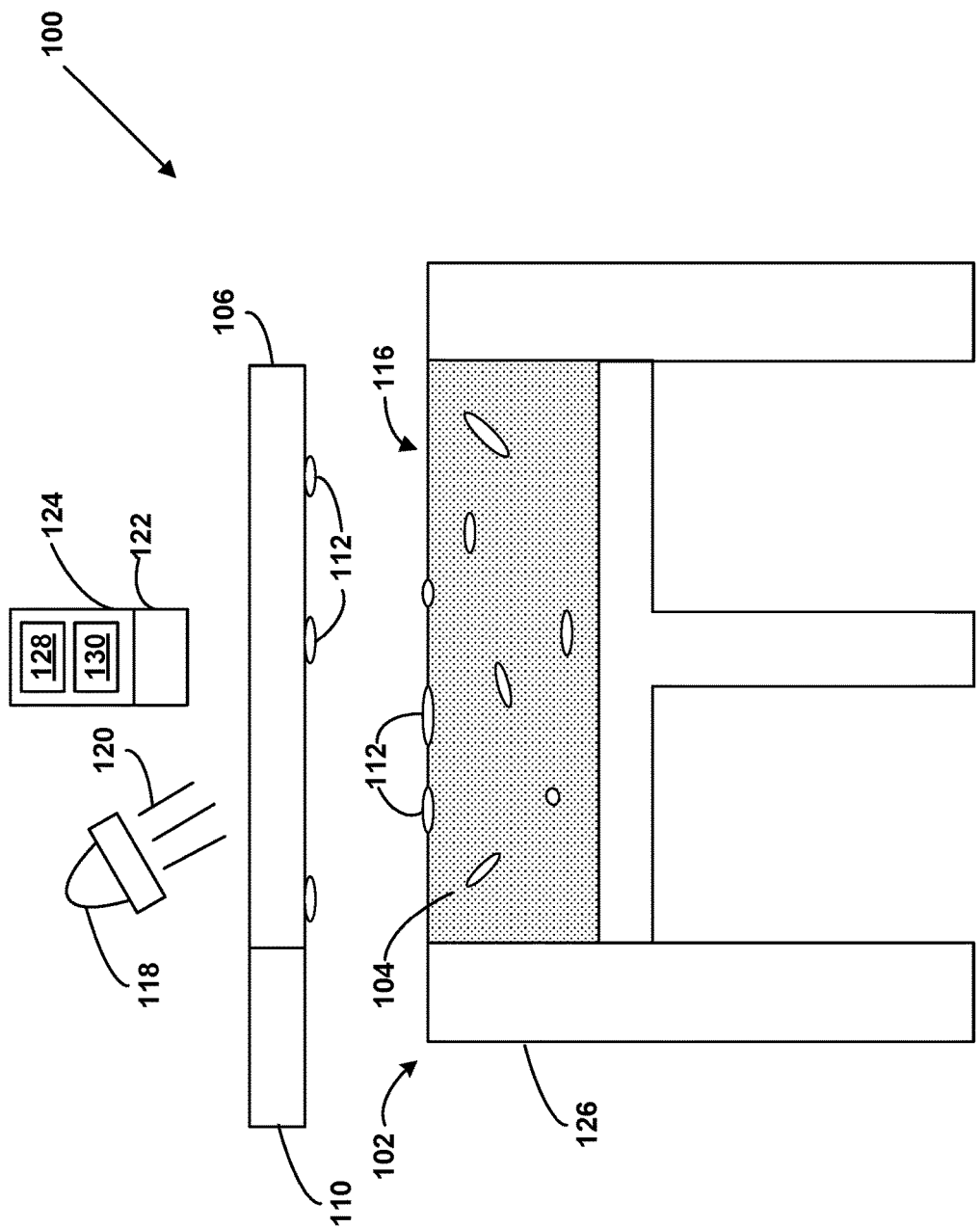
FIG. 1 illustrates a system for detection of impurities in additive manufacturing material, according to an example implementation.

Referring now to the figures, FIG. 1 illustrates a system 100 for extraction and detection of impurities in additive manufacturing material, according to an example implementation. The system 100 includes an additive manufacturing machine 102 for manufacturing a part using additive manufacturing material 104 and a conductive plate 106 adjacent to the additive manufacturing material 104. The system 100 further includes an energy source 110 for distributing an electric charge through the conductive plate 106 adjacent to the additive manufacturing material 104. Distributing the electric charge through the conductive plate 106 attracts impurities 112 from the top layer 116 of the additive manufacturing material 104 to the conductive plate 106.

The additive manufacturing material 104 may be included within a container 126, and can include many types of materials, such as a polymer (e.g., polycarbonate, nylon, epoxy resin), a ceramic (silica or glass), and a metal (steel, titanium alloy, aluminum alloys, etc.), for example. The additive manufacturing material 104 can be in many forms as well, such as powder, liquid, or a combination.

The conductive plate 106 may be transparent or translucent. In some examples, the conductive plate 106 may include a conductive glass or polymer plate, such as indium tin oxide, or a conductive polymer such as Poly(3,4-ethylenedioxythiophene)-tetramethacrylate) PEDOT-TMA), poly (3,4-ethylenedioxythiophene) polystyrene sulfonate (PEDOT:PSS), or Poly(3,4-ethylenedioxythiophene) (PEDOT). The conductive plate 106 is coupled to the energy source 110, such that the energy source 110 can distribute an electric charge across the conductive plate 106. The impurities 112 may be fibers, for example, which are attracted to the electrostatic charge created by the energy source 110 and distributed across the conductive plate 106 and light enough to lift from the additive manufacturing material 104 to the conductive plate 106. The additive manufacturing material 104 may not be attracted to the electrostatic charge and may remain in the container 126.

The conductive plate 106 may be mounted above the container 126 of additive manufacturing material 104. Additionally, the additive manufacturing material 104 may include a top layer 116 of the additive manufacturing material 104, for example, such that the conductive plate 106 attracts the impurities 112 on the top layer 116. For example, when exposed to the conductive plate 106, the impurities 112 will lift from the container 126 to the conductive plate 106.

Within examples, the system 100 can further include a light source 118 for illuminating the conductive plate 106 and a camera 122 for capturing image data of the conductive plate 106 and/or impurities. The light source 118 and the camera 122 can be mounted to illuminate the conductive plate 106 and acquire the image data, and thus, the light source 118 and the camera 122 can be mounted over a container of the additive manufacturing material 104. Additionally, in some examples, the camera 122 may be coupled to a computing device 124 having one or more processors configured to execute instructions stored in memory 130 for processing the image data to determine an amount of impurities on the conductive plate 106. In addition, data from numerous samples over time can be accumulated in the memory 130 so that machine learning can be used to improve the identification of FOD.

In some examples, the light source 118 and the camera 122 are communicatively coupled to the computing device 124. For example, the light source 118 and the camera 122 may be in wired or wireless communication with the computing device 124. The computing device 124 can send instructions to and control operation of the light source 118 and the camera 122, and the light source 118 and the camera 122 can provide outputs to the computing device 124.

The light source 118 can produce a collimated light beam 120. The collimated light beam 120 has parallel or substantially parallel rays, and therefore will spread minimally as it propagates.

In examples where impurities 112 are present on the conductive plate 106, the impurities 112 on the conductive plate 106 will reflect a portion of light from the light source 118 rather than pass through the conductive plate 106 which is transparent or translucent. In other words, the conductive plate 106 may be configured to reflect scattered light where impurities 112 are present while the remaining direct light from the light source 118 passes through the conductive plate 106. This allows detection and identification of the impurities 112.

The camera 122 may be a hi-resolution camera for capturing images. In an example, the camera 122 acquires image data (or otherwise collect or obtains image data), which includes pixels or voxels. The camera 122 (or the computing device 124) may then generate or produce images based on the acquired image data. A representation of the impurities 112 on the conductive plate 106 is then included in the images, for example.

The computing device 124 receives the image data from the camera 122, and processes the image data to determine an amount of impurities 112 on the conductive plate 106. To perform the functions noted above, the computing device 124 includes a processor 128 and memory 130. The computing device 124 may also include hardware to enable communication within the computing device 124 and between the computing device 124 and other devices (not shown). The hardware may include transmitters, receivers, and antennas, for example.

The memory 130 may take the form of non-transitory computer readable media, such as one or more computer-readable storage media that can be read or accessed by the one or more processors 128. The computer-readable storage media can include volatile and/or non-volatile storage components, such as optical, magnetic, organic or other memory or disc storage, which can be integrated in whole or in part with the one or more processors 128. The memory 130 can thus be considered non-transitory computer readable media. In some examples, the memory 130 can be implemented using a single physical device (e.g., one optical, magnetic, organic or other memory or disc storage unit), while in other examples, the memory 130 can be implemented using two or more physical devices. The memory 130 thus is a computer readable medium, and instructions are stored thereon. The instructions include computer executable code.

The one or more processors 128 may be general-purpose processors or special purpose processors (e.g., digital signal processors, application specific integrated circuits, etc.). The one or more processors 128 can be configured to execute the instructions (e.g., computer-readable program instructions) that are stored in the memory 130 and are executable to provide the functionality of the computing device 124 described herein.

The computing device 124 and/or the processors 128 can output data indicative of the amount of impurities 112 on the conductive plate 106. This data may additionally include information about the size, shape, or position of the impurities 112 on the conductive plate 106. As described above, this information may be determined based on the amount of light scattered or reflected from the light source 118.

Within examples, in operation, when the instructions are executed by the one or more processors 128 of the computing device 124, the one or more processors 128 are caused to perform functions for receiving the image data from the camera 122, and processing the image data to determine an amount of impurities on the conductive plate 106.

Figure 2:
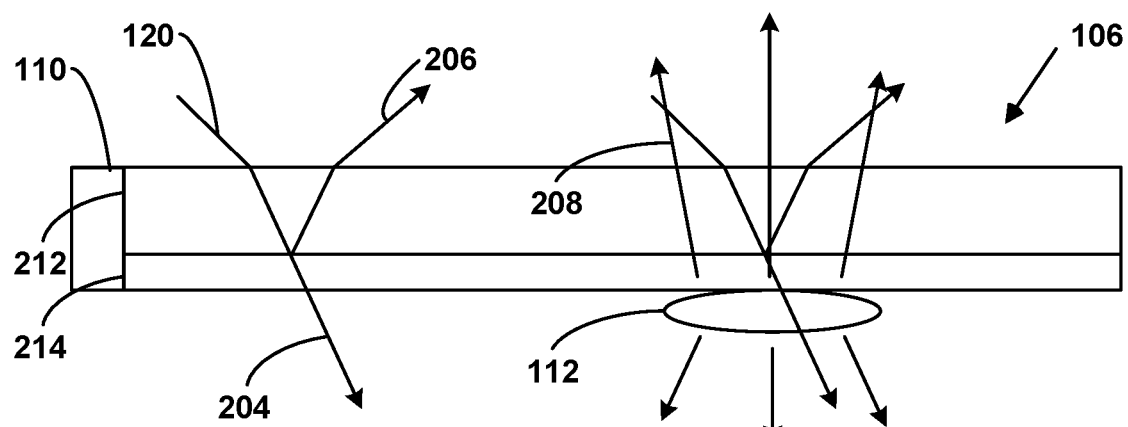
FIG. 2 illustrates a plate and mirror, according to an example implementation.

Now referring to FIG. 2, a conductive plate 106 including a plate 212 and mirror 214, according to an example implementation. In some examples, the mirror 214 is thin enough to allow light to pass through (e.g., translucent). The mirror 214 may also be semi-transparent or reflective on one side and transparent on the other side (e.g., a one-way mirror). The plate 212 may be translucent or transparent such that light from the light source 118 passes through. The plate 212 and/or the mirror 214 are electrically conductive such that the electric charge generating by the energy source 110 distributes the electric charge across the plate 212 and/or mirror and attracts the impurities 112 from the additive manufacturing material 104. In some examples, the conductive plate 106 may just include the mirror 214.

Where no impurities are present on the conductive plate 106, a portion 204 of the collimated light beam 120 shone on the conductive plate 106 passes through the plate and the mirror 214 and a portion 206 of the light beam 120 may be reflect. In contrast, shining the collimated light beam 120 where an impurity 112 is present produces a scattered light site 208. The scattering light site 208 can be detected by the camera 122 and identified by the computing device 124 (shown in FIG. 1). The computing device 124 may identify information about the size, shape, or position of the impurities 112 on the conductive plate 106, as described above.

Figure 3:
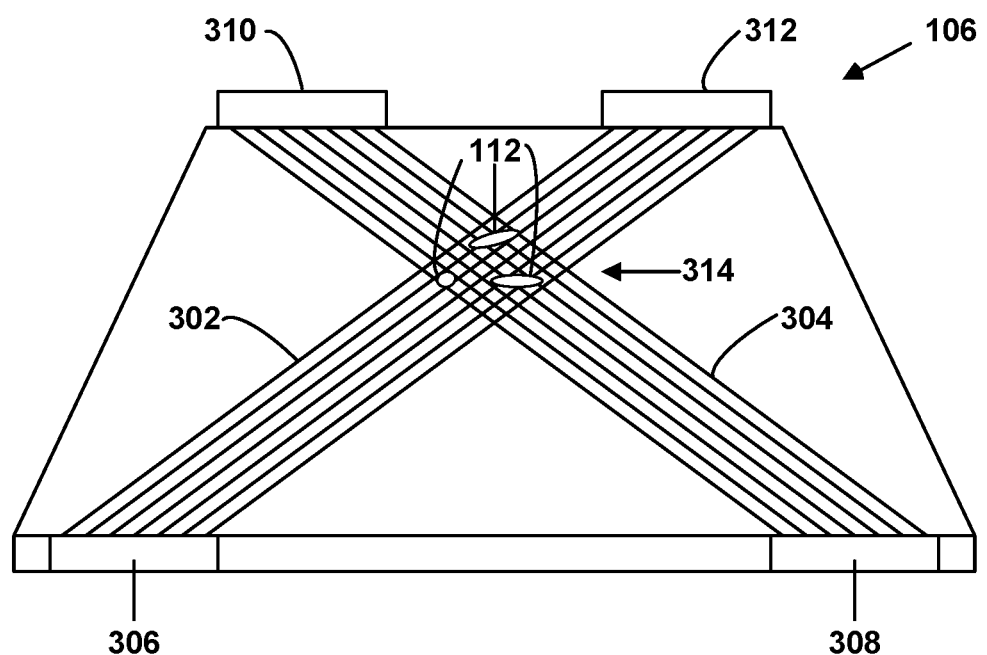
FIG. 3 illustrates a conductive plate, according to an example implementation.

Now referring to FIG. 3, a conductive plate 106 including waveguides, according to example implementations. Within examples, the conductive plate 106 can include a first set of waveguides 302 and a second set of waveguides 304 on a surface of the conductive plate 106. The first set of waveguides 302 and second set of waveguides 304 may intersect at intersection region 314.

Within examples, the conductive plate 106 can include a first optical emitter 306 at a first end of the first set of waveguides 302 and a first optical receiver 312 at the second end of the first set of waveguides 302. The first optical emitter 306 can emit light through the first set of waveguides 302. The first optical receiver 312 can measure light received from the first optical emitter 306 that has traveled through the first set of waveguides 302.

Additionally, the conductive plate 106 can include a second optical emitter 308 at a first end of the second set of waveguides 304 and a first optical receiver 312 at the second end of the second set of waveguides 304. The second optical emitter 308 can emit light through the second set of waveguides 302. The first optical receiver 312 can measure light received from the first optical emitter 306 that has traveled through the first set of waveguides 302.

The first optical emitter 306, first optical receiver 312, second optical emitter 308, and/or the second optical receiver 310 may be coupled to a computing device (such as computing device 124 shown in FIG. 1) having one or more processors (such as computing device 124 shown in FIG. 1) configured to execute instructions stored in memory (such as memory 130 shown in FIG. 1) for processing. Further, in some examples, the first optical emitter 306 and second optical emitter 308 and the first optical receiver 312 and second optical receiver 310 are communicatively coupled to the computing device 124. For example, the first optical emitter 306 and second optical emitter 308 and the first optical receiver 312 and second optical receiver 310 may be in wired or wireless communication with the computing device 124. The computing device 124 can send instructions to and control operation of the first optical emitter 306 and second optical emitter 308 and the first optical receiver 312 and second optical receiver 310, and the first optical emitter 306 and second optical emitter 308 and the first optical receiver 312 and second optical receiver 310 can provide outputs to the computing device 124.

The one or more processors 128 can determine information and data about the impurities 112, such as the size shape, or position of the impurities 112 on the conductive plate 106 based on the light received at the first optical receiver 312 and/or second optical receiver 310. For example, the longer the length of the impurity 112 is, the more waveguides the impurity 112 will interfere with, affecting the light detected at, for example, the first optical receiver 312. Additionally, the intersection region 314 enables the comparison of the detected interferences to determine location and size of the impurities 112. For example, the computing device 124 may recreate the grid of the intersection region 314 using data of light detected at each of the first optical receiver 312 and the second optical receiver 310.

In some examples utilizing waveguides to locate and identify impurities, the additive manufacturing system may not include the light source 118 and/or camera 122, as the first optical emitter 306 and second optical emitter 308 and the first optical receiver 312 and second optical receiver 310 can determine information about the impurities 112 without the light source 118 and/or camera 122.

Figure 4:
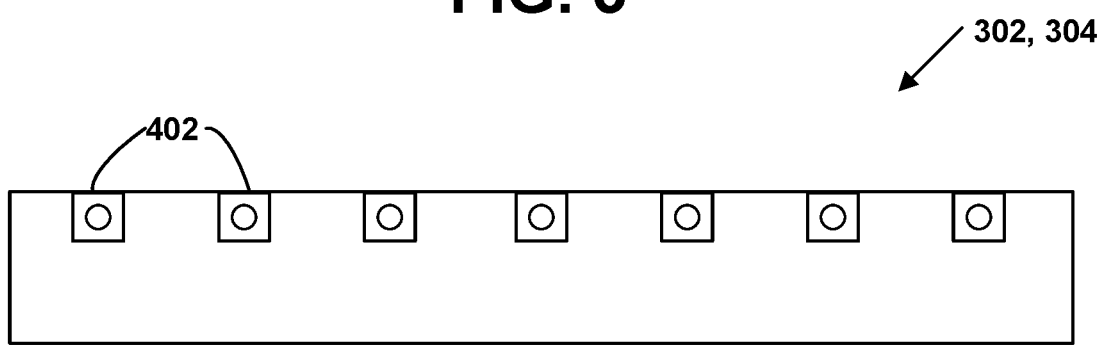
FIG. 4 illustrates waveguides on a conductive plate, according to an example implementation.

Now referring to FIG. 4, a cross-sectional view of waveguides according to example implementations. The waveguides shown in FIG. 4 represent either or both the first set of waveguides 302 and/or the second set of waveguides 304. As shown in FIG. 4, the first and/second set of waveguides 302, 304 can include waveguides 402 within a substrate, such as glass. Within examples, the waveguides 402 may be fused silica.

Figure 5:
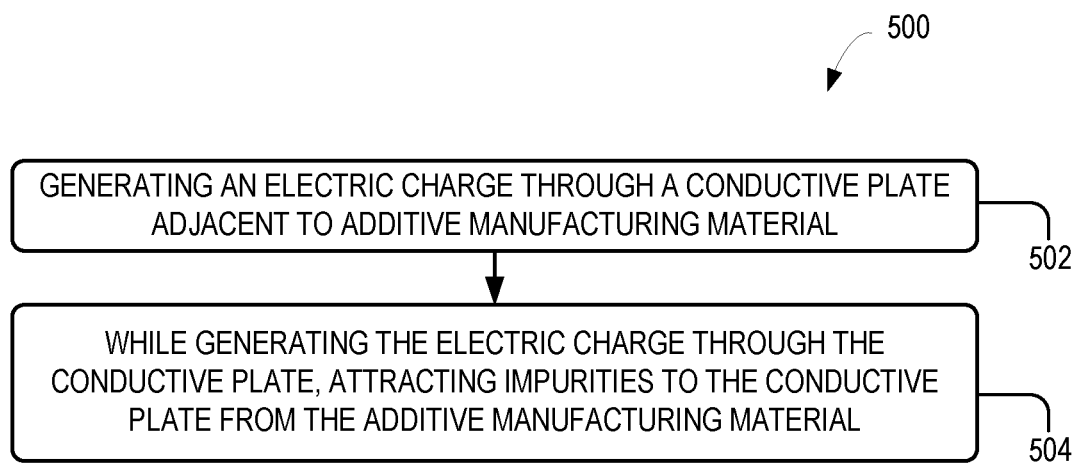
FIG. 5 shows a flowchart of an example of a method for detection and extraction of impurities in additive manufacturing material, according to an example implementation.

FIG. 5 shows a flowchart of an example of a method 500 for extraction and detection of impurities in additive manufacturing material, according to an example implementation. Method 500 shown in FIG. 5 presents an example of a method that could be used with the system 100 shown in FIG. 1, and with the conductive plate 106 shown in FIGS. 2 and 3, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-504. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes generating an electric charge through a conductive plate adjacent to additive manufacturing material.

At block 504, the method 500 includes attracting impurities to the conductive plate from the additive manufacturing material while generating the electric charge through the conductive plate.

Within other examples, method 500 can further include determining an amount of impurities on the conductive plate. Determining the amount of impurities can further include illuminating, by a light source, the conductive plate with light, causing a camera to acquire image data of the conductive plate, and processing the image data to determine the amount of impurities on the conductive plate.

In further examples, detecting the amount of impurities on the conductive plate can include detecting a number of scattered light sites. In these examples, distributing the electric charge through a conductive plate can include distributing the electric charge through a glass plate and a mirror coupled to the glass plate. The mirror can reflect scattered light sites where impurities are present.

Within other examples, method 500 can further include emitting light, by an optical emitter, along waveguides on the conductive plate, where the optical emitter is adjacent to a first end of the waveguides, measuring, by an optical receiver, light received at a second end of the waveguides, and determining, by a processor, at least one of a size, shape, or position of the impurities on the conductive plate based on the light emitted by the optical emitter compared to the light received by the optical receiver.

Further, the optical emitter can be a first optical emitter, the waveguides can be a first set of waveguides, and the optical receiver can a first optical receiver. Method 500 can further include emitting light, by a second optical emitter, along a second set of waveguides on the conductive plate, where the second optical emitter is adjacent to a first end of the second set of waveguides, and where the second set of waveguides intersects with the first set of waveguides. Method 500 can further include measuring, by a second optical receiver, light received at a second end of the waveguides and determining, by the processor, at least one of the size, shape, or position of the impurities based on the light emitted by the second optical emitter compared to the light received by the second optical receiver.

Further, manufacturers employing powder-based additive manufacturing can utilize example methods and system described herein to define a stable and repeatable process used to extract and detect impurities from additive manufacturing material.

B. Producing a Composition in an Additive Manufacturing Material

Within examples, methods for producing a composition of additive manufacturing material involve spreading, by a roller, a layer of additive manufacturing material, the layer including elongated fibers. Example methods further include generating an electric field across the layer of additive manufacturing material and aligning the elongated fibers within the layer. Example methods can additionally include solidifying, by way of an energy source, the layer of additive manufacturing material and aligned elongated fibers.

Generally, the additive manufacturing machine operates by manufacturing parts in a layer-wise construction of a plurality of layers of material. Additive manufacturing may involve applying liquid or powder material to a work area, and then performing a combination of sintering, curing, melting, and/or cutting to create a layer. The process is repeated up to several thousand times to construct a desired finished part or apparatus. The additive manufacturing machine may include components, such as a printing head or printer nozzle, control mechanisms (e.g., computing device), molds, etc., depending on a type of manufacturing being used. A range of processes finding industrial applications for additive manufacturing includes direct metal deposition, electron beam melting, polymer processes such as fused filament fabrication (FFF), fused deposition (FDM), Solid Ground Curing (SGC), Laminated Object Manufacturing (LOM), and select laser sintering (SLS) or selective laser melting (SLM), among others. The additive manufacturing machine may include components specific to any of these processes, or in some examples, the additive manufacturing machine may include hybrid machine tools to combine additive manufacturing with subtractive machining. The additive manufacturing machine may additionally include a laser metal powder bed where a laser melts down the metal powder in material layers (e.g., direct metal laser sintering, selective laser melting).

The part produced using the additive manufacturing machine is built up by laying down a layer of material on a build platform layer-by-layer. This process provides properties comparable to that of a casting.

Example methods and systems described herein enables alignment of fibers within the layers of the additive manufacturing material. The additive manufacturing material and the resulting manufactured part or apparatus, may then have enhanced isotropic or anisotropic structural, electronic, and/or thermal properties.

The example methods for producing the composition of additive manufacturing material can be used in an additive manufacturing system, for example. An example additive manufacturing system can include an additive manufacturing machine for manufacturing a part using additive manufacturing material and a roller for spreading a layer of additive manufacturing material, where the additive manufacturing material includes elongated fibers. An example system further includes an electric field generator for generating an electric field across the layer of additive manufacturing material and aligning the elongated fibers within the layer and an energy source for solidifying the layer of additive manufacturing material and aligned elongated fibers.

Figure 6:
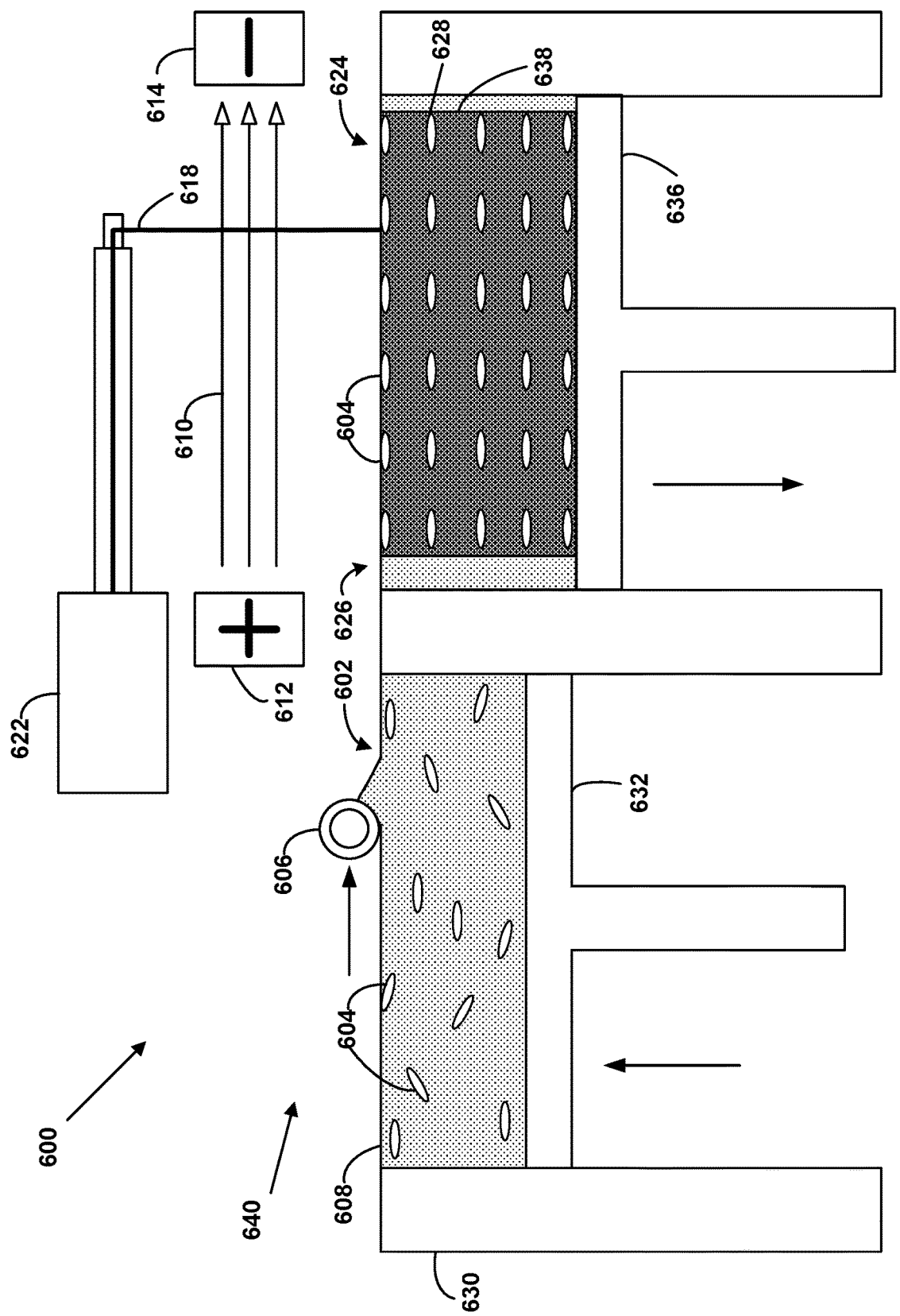
FIG. 6 illustrates a system for production of a composition in additive manufacturing material, according to an example implementation.

Now referring to FIG. 6, an additive manufacturing system for producing an additive manufacturing material compound. The system 600 includes an additive manufacturing machine 640 for manufacturing a part using additive manufacturing material and a roller 606 for spreading a layer 624 of additive manufacturing material, where the layer 624 of the additive manufacturing material includes elongated fibers 604. The system 600 further includes an electric field generator 612, 614 for generating an electric field 610 across the layer 624 of additive manufacturing material and aligning the elongated fibers 604 within the layer 624. The system 600 further includes an energy source 622 for solidifying the layer 624 of additive manufacturing material and aligned elongated fibers 604.

The elongated fibers 604 may be added to the additive manufacturing material powder 608 in a bin 630. Within examples, elongated fibers 604 can include silicon fibers, zinc oxide fibers, polyethylene fibers, or carbon fibers. In some example implementations, the elongated fibers 604 may all be the material (e.g., silicon fibers). In alternative examples, the elongated fibers 604 can include a combination of materials (e.g., silicon fibers and carbon fibers). Further, in some examples, the elongated fibers 604 may include wires, microwires, nanowires, fibers, microfibers, or nanofibers.

In practice, the roller 606 can gather the top surface 602 of the additive manufacturing material powder 608 and the elongated fibers 604 and spread a layer of the additive manufacturing material powder 608 and the elongated fibers 604 into bin 626 for alignment and solidifying. This process can be repeated, for example, as a bed 632 of the bin raises upwards and the roller 606 travels from bin 630 to bin 626 to create article 638. The article 638 can include a plurality of layers of solidified powder and elongated fibers 604.

Within examples, the electric field generator 612, 614 can be, for example, a Van de Graff generator, among other examples. The electric field generator 612, 614 can be mounted above bin 626. Within examples, the electric field 610 causes the elongated fibers 604 to align in the direction of the electric field 610. This results in alignment of the elongated fibers 604 within the layer 624 of the additive manufacturing material. Alignment of the elongated fibers 604 within the layer 624 can produce a composition with anisotropic mechanical, thermal, and/or optical properties. For example, the layer 624 of additive manufacturing material may conduct heat in one direction and not the other. Additionally, within examples, the electric field generator 612, 614 may be mounted such that it can be rotated about the bin 626 and thus create an electric field in directions.

Within examples, the energy source 622 can emit beam 618 which can be a laser beam or electron beam, for example. In either example, the energy source 622 is configured to solidify the layer 624 of additive manufacturing material and the aligned elongated fibers 604. It is desirable to solidify the elongated fibers 604 to retain the alignment created by the electric field 610 and resulting desired qualities of the material (e.g., conduct heat in one direction and not the other).

This process may be repeated a number of times for a plurality of layers. A bed 636 of bin 626 may lower to allow more layers of additive manufacturing material powder 608 to be spread. In these examples, a second layer of additive manufacturing material (e.g., second layer 628) where the second layer 628 of the additive manufacturing material includes a second set of elongated fibers 604. The electric field generator 612, 614 is configured to generate a second electric field across the second layer 628 of additive manufacturing material and align the second set of elongated fibers 604 in the direction of the electric field 610, as described above. The energy source 622 is then configured to solidify the second layer 628 of additive manufacturing material and the second set of elongated fibers.

Further, within examples, the alignment of elongated fibers 604 within each layer may vary. For example, the electric field generator may align the elongated fibers 604 in the layer 624, which can, for purposes of example, be considered the first layer, in a first direction based on the direction of the electric field 610. The electric field generator 612, 614 may rotate to align the elongated fibers 604 of the second layer 628 in a second direction, different than the first direction. Accordingly, the elongated fibers 604 may be aligned in a different direction in each layer (e.g., the electrical field generator 612, 614 may gradually rotate as new layers of additive manufacturing material powder are spread, aligned, and solidified), resulting in a twisted, chiral, spiral-like, or heliacal structures. Alternatively, the elongated fibers 604 direction aligns within multiple layers (i.e., the elongated fibers 604 are aligned with each other across multiple layers). This may be desirable to increase torsional rigidity the solidified material, for example.

Figure 7:
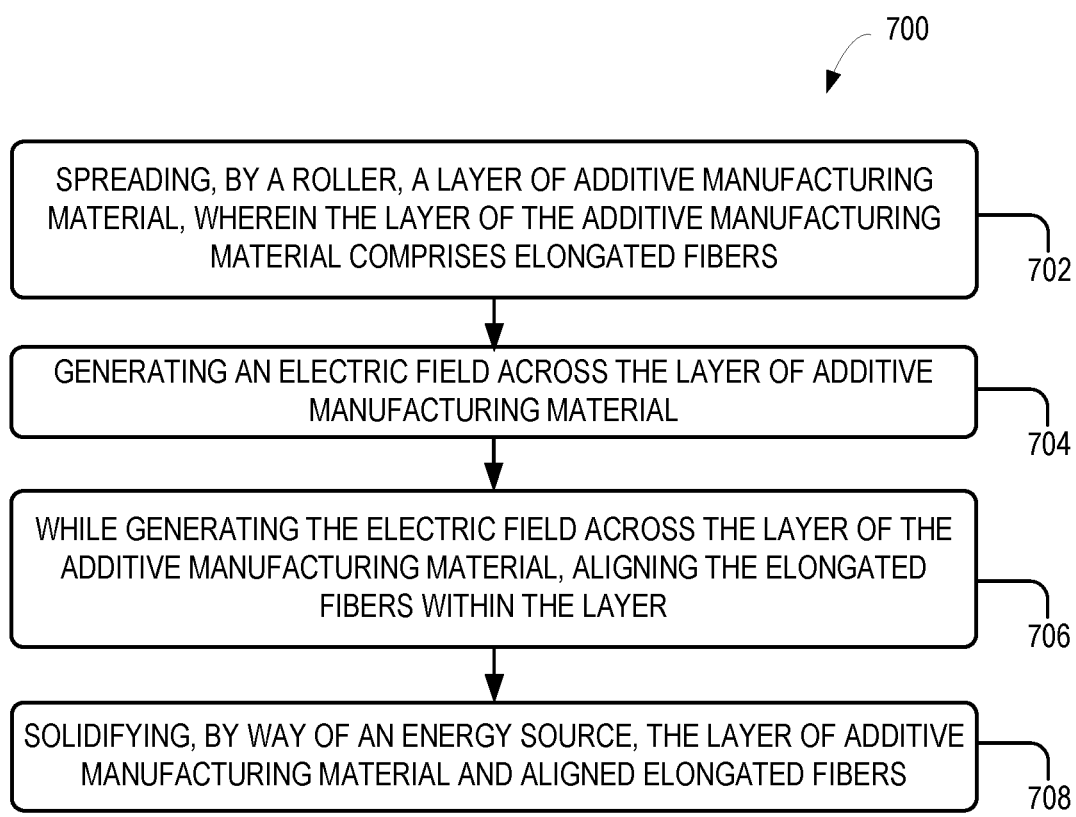
FIG. 7 shows a flowchart of an example of a method for production of a composition in additive manufacturing, according to an example implementation.

FIG. 7 shows a flowchart of an example of a method 700 for producing a composition of additive manufacturing material, according to an example implementation. Method 700 shown in FIG. 7 presents an example of a method that could be used with the system 600 shown in FIG. 6. Further, devices or systems may be used or configured to perform logical functions presented in FIG. 7. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes spreading, by a roller, a layer of additive manufacturing material, wherein the layer of the additive manufacturing material comprises elongated fibers.

At block 704, method 700 includes generating an electric field across the layer of additive manufacturing material.

At block 706, method 700 involves aligning the elongated fibers within the layer while generating the electric field across the layer of the additive manufacturing material. Within examples, block 706 may further involve At block 708, method 700 includes solidifying, by way of an energy source, the layer of additive manufacturing material and aligned elongated fibers.

Within examples, the layer of additive manufacturing material is a first layer of additive manufacturing material, the electric field is a first electric field, and the elongated fibers are a first set of elongated fibers. In these examples, method 700 includes spreading, by the roller, a second layer of additive manufacturing material, where the second layer of the additive manufacturing material comprises a second set of elongated fibers. Method 700 may then involve aligning the first set of elongated fibers in a first direction, and aligning the second set of elongated fibers comprises aligning the second set of elongated fibers in a second direction, different from the first direction.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An additive manufacturing system for extraction of impurities in additive manufacturing material, the system comprising:
    an additive manufacturing machine for manufacturing a part using additive manufacturing material;
    a conductive plate adjacent to the additive manufacturing material, wherein the conductive plate comprises:
        a glass plate; and
        a mirror coupled to the glass plate, wherein the mirror is configured to reflect scattered light sites where the impurities are present;
    a light source for illuminating the conductive plate with light;
    a camera for capturing image data of the conductive plate; and
    an energy source for distributing an electric charge through the conductive plate adjacent to the additive manufacturing material, wherein distributing the electric charge through the conductive plate attracts impurities from the additive manufacturing material to the conductive plate.

2. The additive manufacturing system of claim 1, further comprising:
a computing device having one or more processors configured to execute instructions stored in memory for processing the image data to determine an amount of impurities on the conductive plate.

3. The additive manufacturing system of claim 1, wherein the conductive plate comprises conductive glass or polymer.

4. The additive manufacturing system of claim 1, further comprising:
waveguides on the conductive plate;
an optical emitter at a first end of the waveguides for emitting light through the waveguides;
an optical receiver at a second end of the waveguides for measuring light received from the optical emitter; and
a processor for determining at least one of a size, shape, or position of the impurities on the conductive plate based on the light emitted by the optical emitter compared to the light received by the optical receiver.

5. The additive manufacturing system of claim 4, wherein the waveguides are a first set of waveguides, the optical emitter is a first optical emitter, the optical receiver is a first optical receiver, and wherein the additive manufacturing system further comprises:
a second set of waveguides on the conductive plate, wherein the second set of waveguides intersects with the first set of waveguides;
a second optical emitter at a first end of the second set of waveguides for emitting light through the second set of waveguides;
a second optical receiver at a second end of the second set of waveguides for measuring light from the second optical emitter; and
wherein the processor is configured to determine at least one of the size, shape, or position of the impurities on the conductive plate based on the light emitted by the first optical emitter compared to the light received by first the optical receiver and the light emitted by the second optical emitter compared to the light received by second the optical receiver.

6. A method for extracting impurities in additive manufacturing material from a container of an additive manufacturing machine, the method comprising:
generating an electric charge through a conductive plate of the additive manufacturing machine, the conductive plate being adjacent to the additive manufacturing material, wherein the conductive plate comprises a glass plate, and a mirror coupled to the glass plate, wherein the mirror is configured to reflect scattered light sites where the impurities are present;
determining an amount of the impurities on the conductive plate, wherein determining the amount of the impurities further comprises:
illuminating, by a light source, the conductive plate with light;
while illuminating the conductive plate with the light, causing a camera to acquire image data of the conductive plate; and
processing the image data to determine the amount of the impurities on the conductive plate; and
while generating the electric charge through the conductive plate, attracting the impurities to the conductive plate from the additive manufacturing material.

7. The method of claim 6, wherein distributing the electric charge through the conductive plate comprises distributing the electric charge through a conductive glass plate.

8. The method of claim 6, wherein the conductive plate comprises conductive glass.

9. The method of claim 6, wherein the conductive plate comprises a polymer.

10. The method of claim 6, further comprising:
emitting light, by an optical emitter, along waveguides on the conductive plate, wherein the optical emitter is adjacent to a first end of the waveguides;
measuring, by an optical receiver, light received at a second end of the waveguides; and
determining, by a processor, at least one of a size, shape, or position of the impurities on the conductive plate based on the light emitted by the optical emitter compared to the light received by the optical receiver.

11. The method of claim 10, wherein the optical emitter is a first optical emitter, the waveguides are a first set of waveguides, the optical receiver is a first optical receiver, and wherein the method further comprises:
emitting light, by a second optical emitter, along a second set of waveguides on the conductive plate, wherein the second optical emitter is adjacent to a first end of the second set of waveguides, and wherein the second set of waveguides intersects with the first set of waveguides;
measuring, by a second optical receiver, light received at a second end of the waveguides; and
determining, by the processor, at least one of the size, shape, or position of the impurities based on the light emitted by the second optical emitter compared to the light received by the second optical receiver.

12. An additive manufacturing system for extraction of impurities in additive manufacturing material, the system comprising:
an additive manufacturing machine for manufacturing a part using additive manufacturing material;
a conductive plate adjacent to the additive manufacturing material;
waveguides on the conductive plate;
an optical emitter at a first end of the waveguides for emitting light through the waveguides;
an optical receiver at a second end of the waveguides for measuring light received from the optical emitter;
a processor for determining at least one of a size, shape, or position of the impurities on the conductive plate based on the light emitted by the optical emitter compared to the light received by the optical receiver; and
an energy source for distributing an electric charge through the conductive plate adjacent to the additive manufacturing material, wherein distributing the electric charge through the conductive plate attracts impurities from the additive manufacturing material to the conductive plate.

13. The additive manufacturing system of claim 12, wherein the conductive plate comprises conductive glass.

14. The additive manufacturing system of claim 12, wherein the conductive plate comprises polymer.

15. The additive manufacturing system of claim 12, wherein the waveguides are a first set of waveguides, the optical emitter is a first optical emitter, the optical receiver is a first optical receiver, and wherein the additive manufacturing system further comprises:
a second set of waveguides on the conductive plate, wherein the second set of waveguides intersects with the first set of waveguides;

a second optical emitter at a first end of the second set of waveguides for emitting light through the second set of waveguides; and a second optical receiver at a second end of the second set of waveguides for measuring light from the second optical emitter.

16. The additive manufacturing system of claim 15, wherein the processor is configured to determine at least one of the size, shape, or position of the impurities on the conductive plate based on the light emitted by the first optical emitter compared to the light received by first the optical receiver and the light emitted by the second optical emitter compared to the light received by second the optical receiver.

17. The additive manufacturing system of claim 12, further comprising:

a light source for illuminating the conductive plate with light; and a camera for capturing image data of the conductive plate.

18. The additive manufacturing system of claim 17, wherein the processor is configured to process the image data to determine an amount of impurities on the conductive plate.

19. The additive manufacturing system of claim 17, wherein the conductive plate comprises a glass plate.

20. The additive manufacturing system of claim 19, wherein the conductive plate comprises a mirror coupled to the glass plate, wherein the mirror is configured to reflect scattered light sites where the impurities are present.

* * * * *